United States Patent
Sitaram et al.

(10) Patent No.: US 10,045,359 B1
(45) Date of Patent: Aug. 7, 2018

(54) METHOD AND SYSTEM FOR MANAGING CARRIERS BASED ON SIMULTANEOUS VOICE AND DATA COMMUNICATION

(71) Applicant: Sprint Spectrum L.P., Overland Park, KS (US)

(72) Inventors: Krishna Sitaram, Chantilly, VA (US); Chunmei Liu, Great Falls, VA (US); Hemanth B. Pawar, Brambleton, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 129 days.

(21) Appl. No.: 15/063,758

(22) Filed: Mar. 8, 2016

(51) Int. Cl.
| | |
|---|---|
| *H04L 12/24* | (2006.01) |
| *H04W 72/08* | (2009.01) |
| *H04W 76/04* | (2009.01) |
| *H04M 7/00* | (2006.01) |
| *H04W 72/04* | (2009.01) |
| *H04W 76/27* | (2018.01) |

(52) U.S. Cl.
CPC ......... *H04W 72/085* (2013.01); *H04M 7/006* (2013.01); *H04W 72/042* (2013.01); *H04W 72/0413* (2013.01); *H04W 76/046* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 5,583,869 | A | 12/1996 | Grube et al. |
| 6,721,569 | B1 | 4/2004 | Hashem et al. |
| 9,107,200 | B1 | 8/2015 | Naim et al. |
| 2006/0221939 | A1 | 10/2006 | Rosen et al. |
| 2006/0233188 | A1 | 10/2006 | Oliver et al. |
| 2008/0013480 | A1 | 1/2008 | Kapoor et al. |
| 2008/0254833 | A1 | 10/2008 | Keevill et al. |
| 2010/0093281 | A1 | 4/2010 | Khanka et al. |
| 2010/0309930 | A1 | 12/2010 | Harrison et al. |
| 2012/0252477 | A1 | 10/2012 | Rao |

(Continued)

FOREIGN PATENT DOCUMENTS

EP   2 385 653 A2   11/2011

OTHER PUBLICATIONS

U.S. Appl. No. 141507,128, filed Oct. 6, 2014.

(Continued)

*Primary Examiner* — Edan Orgad
*Assistant Examiner* — Sithu Ko

(57) ABSTRACT

A method and system for dynamically controlling when a base station will provide a UE with carrier aggregation service rather than serving the UE on just a single carrier. The base station dynamically invokes carrier aggregation service for the UE in response to detecting simultaneous voice and data communication by the UE. And the base station dynamically discontinues providing carrier aggregation service for the UE, and transitions to serving the UE on just a single carrier, in response to detecting that the UE's simultaneous voice and data communication has ended and that the UE is engaged in just voice communication or just data communication.

17 Claims, 5 Drawing Sheets

(56) References Cited

U.S. PATENT DOCUMENTS

| | | |
|---|---|---|
| 2012/0281536 A1* | 11/2012 | Gell ............... H04W 28/06 370/235 |
| 2012/0282942 A1 | 11/2012 | Uusitalo et al. |
| 2013/0010709 A1* | 1/2013 | Earnshaw ........... H04L 5/001 370/329 |
| 2013/0010711 A1 | 1/2013 | Larsson et al. |
| 2013/0039302 A1 | 2/2013 | Miki et al. |
| 2013/0083661 A1* | 4/2013 | Gupta ............. H04W 28/0215 370/235 |
| 2013/0109372 A1 | 5/2013 | Ekici |
| 2014/0170990 A1 | 6/2014 | Black et al. |
| 2015/0305011 A1 | 10/2015 | Bergstrom et al. |

OTHER PUBLICATIONS

U.S. Appl. No. 141575,455, filed Dec. 18, 2014.
"Carrier Aggregation—Activation and Deactivation of Secondary Calls," How LTE Stuff Works, printed from the World Wide Web, dated Oct. 17, 2014.
First Action Interview Pilot Program Pre-Interview Communication from U.S. Appl. No. 14/575,455, dated Sep. 9, 2016.

* cited by examiner

METHOD AND SYSTEM FOR MANAGING CARRIERS BASED ON SIMULTANEOUS VOICE AND DATA COMMUNICATION

BACKGROUND

Unless otherwise indicated herein, the description provided in this section is not itself prior art to the claims and is not admitted to be prior art by inclusion in this section.

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining one or more ranges of frequency spectrum and having a respective downlink channel for carrying communications from the base station to UEs and a respective uplink channel for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but are distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide service, and the base station then schedule particular downlink and uplink resource blocks on that carrier to carry data communications to and from the UE. Further, the base station and UE may modulate their air interface data communications at a coding rate selected based on quality of the UE's coverage, such as with higher rate coding rate when the UE is in better coverage of the base station and with a lower coding rate when the UE is in worse coverage of the base station.

In such an LTE system, for instance, when the base station has data to transmit to a UE, the base station may assign certain downlink resource blocks (and thus certain sub-carriers) in a given sub-frame for use to carry the data to the UE at a particular coding rate, and the base station may then (i) transmit to the UE in that sub-frame a downlink control information (DCI) message that specifies the assigned resource blocks and coding rate and (ii) encode and transmit the data to the UE in the assigned resource blocks in that sub-frame. Per the DCI message, the UE would then read the transmitted data from the assigned resource blocks. Likewise, when the UE has data to transmit to the base station and accordingly transmits a scheduling request to the base station, the base station may assign certain uplink resource blocks in a given sub-frame for use to carry the data from the UE at a particular coding rate and may transmit to the UE, in advance of that sub-frame, a DCI message that specifies the assigned resource blocks and coding rate. And the UE may then encode and transmit the data to the base station in the assigned resource blocks in that sub-frame.

A base station may serve a UE on a single carrier, such as the carrier on which the UE attaches with the base station, in which case the base station may allocate resources on that carrier for use to carry communications to and from the UE. Alternatively, the base station may serve the UE on multiple carriers at once, providing "carrier aggregation" service. With carrier aggregation service, the base station serves the UE concurrently on multiple carriers from either contiguous frequency bands or non-contiguous frequency bands, in which case the base station may allocate resources on those multiple carriers at once to carry communications to and from the UE. Further, one of the carriers may be deemed to be a primary carrier or primary cell (PCell) and each other carrier may be deemed to be a secondary carrier or secondary cell (SCell). The PCell and each SCell could then be used to carry communications to and from the UE, and the PCell could also function as a primary transport for certain control signaling between the base station and the UE.

OVERVIEW

Disclosed herein is a method and system for dynamically controlling when a base station will provide a UE with carrier aggregation service rather than serving the UE on just a single carrier. In accordance with the disclosure, the base station will dynamically invoke carrier aggregation service for the UE in response to detecting simultaneous voice and data communication by the UE. Further, the base station may dynamically discontinue providing carrier aggregation service for the UE, and transition to serving the UE on just a single carrier, in response to detecting that the UE's simultaneous voice and data communication has ended and that the UE is engaged in just voice communication or just data communication.

The disclosed method and system can be usefully implemented in a base station that supports wireless packet-based communication. In that case, the voice communication at issue could be a voice over Internet Protocol (VoIP) call, and the data communication could be communication other than a VoIP call, such as e-mail traffic, web browsing traffic, file transfer traffic, video streaming traffic, gaming traffic, or the like.

In accordance with the disclosure, a base station could be serving a UE over an air interface connection that encompasses just a single carrier, and the UE could be engaged in just voice communication or just data communication, rather than both concurrently. For instance, the UE could be engaged in a VoIP call and not engaged in data communication during the VoIP call. Or the UE could be engaged in data communication when not engaged in a VoIP call. While so serving the UE, the base station could then monitor the type of communication in which the UE engages and could thereby detect the start of simultaneous voice and data communication by the UE. For instance, the base station could detect that, while the UE is engaged in a VoIP call, the UE starts to engage concurrently in data communication, or that, while the UE is engaged in data communication, the UE starts to engage concurrently in a VoIP call. And in response to detecting the simultaneous voice and data communication, the base station could then invoke carrier aggregation service for the UE, by modifying the UE's air interface connection to encompass multiple carriers and then serving the UE on the multiple carriers concurrently.

Further, while serving the UE with carrier aggregation as the UE is engaged in simultaneous voice and data communication, the base station could monitor the type of communication in which the UE engages and could thereby detect when the simultaneous voice and data communication ends and the UE engages in just voice communication or just data communication. For instance, the base station could detect when the UE's VoIP call ends while the UE's data communication continues, or the base station could detect when the UE's data communication ends while the UE's VoIP call continues. And in response to detecting the end of the UE's simultaneous voice and data communication and the continuation of the UE's voice communication or data communication, the base station could then discontinue carrier aggregation service for the UE, by modifying the UE's air interface connection to encompass just a single carrier and then serving the UE on just that single carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
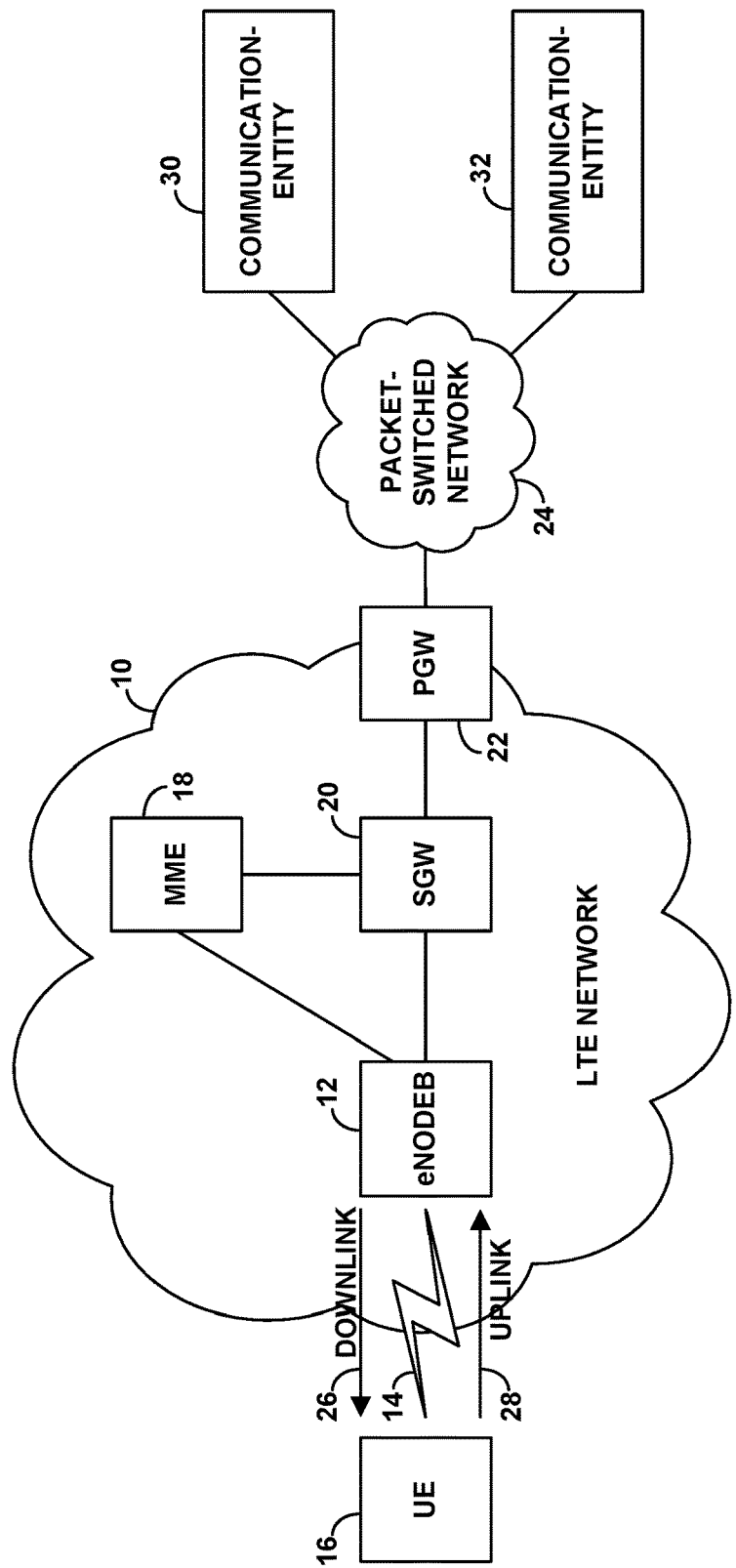
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12, which has an antenna structure and associated equipment for providing an LTE coverage area 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network may sit as nodes on a private packet-switched network owned by an operator of the LTE network, and thus the various communication interfaces may be logical interfaces through that network.

With the arrangement of FIG. 1, the UE may engage in communication with various remote communication-entities, such as servers or other end-user devices, on or via network 24. FIG. 1 depicts two such example entities, 30 and 32. These entities may take various forms and may be configured to communicate different types of content. By way of example, one entity may be voice-call server such as an Internet Multimedia Subsystem (IMS) platform that provides voice-call services for UEs such as UE 16, and other entity may be a data server such as a web server, e-mail server, streaming video server, game server, or the like. Other examples are possible as well.

As illustrated, the air interface of coverage area 14 defines a downlink direction 26 from the eNodeB to the UE and an uplink direction 28 from the UE to the eNodeB. Further, the eNodeB and UE may be configured (e.g., licensed and programmed) to support air interface communication on various particular carriers, which may be FDD or TDD. Each such carrier and/or its particular downlink and uplink channels may span a particular bandwidth (such as 1.4 MHz, 3 MHz, 5 MHz, 10 MHz, 15 MHz, or 20 MHz) and may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect the eNodeB's coverage on a particular carrier, and the UE and eNodeB may engage in an attach process or handover process to register with the LTE network on that carrier. For instance, the UE may initially transmit an access request message on the carrier to the eNodeB, and the UE and eNodeB may then engage in signaling in accordance with the Radio Resource Control (RRC) protocol to establish an RRC connection defining an air interface connection on which the UE and eNodeB can engage in further communication. In turn, the UE may then transmit to the eNodeB via the RRC connection an attach request seeking to register with the LTE network and be served by the eNodeB, and the eNodeB may pass the attach request along to the MME for processing.

After authenticating the UE, the MME may then engage in signaling with the eNodeB and SGW to establish for the UE one or more logical bearer connections, or bearers, between the UE and the PGW. Each such bearer may include a radio bearer portion over the air between the UE and the eNodeB, and a service bearer or access bearer portion between the eNodeB and the PGW via the SGW. Further, each such bearer may have a respective service level defining a quality of service (QoS) of communications over the bearer, such as whether the bearer is to provide a certain guaranteed bit rate (GBR) level of throughput or is rather a best-efforts bearer. More particularly, each bearer may have a respective Quality of Service Class Identifier (QCI) value that indicates a QoS class of the bearer and associates the bearer with a particular type of communication. For example, a QCI 1 bearer is a GBR bearer having a high level of QoS and is associated specifically with VoIP-call communication, a QCI 4 bearer is a GBR bearer having a mid-level of QoS and is associated specifically with non-conversational video streaming, a QCI 5 bearer is a best-efforts bearer having mid-level QoS and is associated specifically with packet-based signaling for setup of packet-based real-time media communications such as VoIP calls for instance, and a QCI 9 bearer is a best-efforts bearer having low-level QoS and is associated specifically with general Internet traffic such as e-mail, chat, file transfer, and the like.

In general operation, at the time of initial attachment, the MME may establish for a UE a QCI 9 bearer or other general Internet bearer, to enable the UE to engage in general data communication. Further, the MME may establish one or more additional bearers for the UE based on UE capabilities or service-profile information. For instance, if the UE is configured to support VoIP call communication, then the MME may also establish for the UE a QCI 5 bearer through which the UE can engage in VoIP call setup signaling, such as Session Initiation Protocol (SIP) signaling, with a VoIP call platform such as an Internet Multimedia System (IMS) or the like to facilitate setup (e.g., placement or reception) of a voice call.

Further, while the eNodeB is serving the UE, the MME may add or remove one or more bearers from the UE's service. For example, if the UE engages in SIP signaling with an IMS to set up a VoIP call, control signaling may pass from the IMS to the PGW to the SGW and to the MME, triggering the MME to establish for the UE a QCI 1 bearer for carrying VoIP call packets (namely, packets carrying digitized speech to or from the UE in a voice call), and the UE's VoIP call traffic would then flow via that QCI 1 bearer. In turn, when the UE's VoIP call ends, control signaling may pass from the IMS to the PGW to the SGW and to the MME, triggering the MME to tear down the UE's QCI 1 bearer as it is then no longer of use. Similar examples are possible for other types of services, such as for video streaming over a QCI 4 bearer, or the like.

When an eNodeB serves a UE on just a single carrier, such as a carrier on which the UE initially attached with the eNodeB (or another carrier to which the eNodeB transfers the UE for one reason or another), the eNodeB may be considered to be serving the UE in a single-carrier mode rather than a carrier aggregation mode. In the single-carrier mode, the UE's air interface connection with the eNodeB encompasses just one carrier, and the eNodeB and UE are set to communicate with each other on that carrier rather than on multiple carriers.

While so serving the UE in the single-carrier mode, the eNodeB may schedule communications of various types to and from the UE on the single-carrier. On the downlink, for instance, the eNodeB may receive from the SGW various IP packets destined for the UE, and the packets may include a header parameter (e.g., differential service point code (DSCP) tag) that corresponds with the bearer on which the packet-data is being communicated and thus perhaps indicates or suggests the type of communication. The eNodeB may then buffer the received packets and schedule and engage in transmission of the packets to the UE on the UE's single serving carrier. And on the uplink, the eNodeB may receive from the UE a scheduling request for transmission of packets on a particular bearer, the eNodeB may schedule transmission of those packets on the UE's single serving carrier, the UE may thus engage in the transmission on that carrier, and the eNodeB may then pass the packets to the SGW for transmission ultimately by the PGW.

At some point while serving the UE in the single-carrier mode (or perhaps at the time of initial attachment in an appropriate situation), the eNodeB and UE may also engage in RRC signaling to establish carrier-aggregation service for the UE. For example, when the eNodeB is serving the UE in the single-carrier mode, the eNodeB and UE may engage in RRC connection-configuration signaling to transition from the single-carrier mode to a carrier-aggregation mode, by changing the UE's air interface connection to encompass multiple carriers rather than just one carrier. In a representative process, for instance, the eNodeB may transmit to the UE an RRC connection-reconfiguration message that specifies multiple carriers on which the eNodeB will be serving the UE, identifying each carrier by its global identifier so that the UE will be able to tune to the carrier, and perhaps indicating which carrier will be the PCell and which one or more other carriers will each be an SCell.

In the carrier-aggregation mode, the UE's air interface connection with the eNodeB encompasses multiple carriers, and the eNodeB and UE are set to communicate with each other on those multiple carriers, rather than on just a single carrier. In this mode, the eNodeB may thus schedule communications of various types to and from the UE on the multiple carriers, possibly distributing a given communication or type of communication concurrently among the multiple carriers, or possibly putting each separate type of communication on a separate respective one of the carriers. On the downlink, the eNodeB may thus receive from the SGW various IP packets destined for the UE, buffer the received packets, and schedule and engage in transmission of the packets to the UE one or more of the multiple carriers in the UE's air interface connection. And on the uplink, the eNodeB may receive from the UE a scheduling request for transmission of packets, the eNodeB may schedule transmission of those packets on one or more of the multiple carriers in the UE's air interface connection, the UE may thus engage in the transmission of the packets accordingly, and the eNodeB may pass the packets to the SGW for transmission ultimately by the PGW.

In practice, the UE and eNodeB may also each establish and store a respective context record defining attributes of the UE's RRC connection, including a specification of the carrier or carriers on which the eNodeB is serving the UE, and a specification of each bearer currently established for the UE, and the UE and eNodeB may each refer to that context record as a basis to govern how they communicate with each other.

For instance, if their context records indicate that the eNodeB is serving the UE in a single-carrier mode, then the eNodeB may be set to schedule and manage air interface communications to and from the UE on the one serving carrier, at service level(s) in accordance with the bearer(s) at issue, and the UE may be set to monitor and report to the eNodeB the channel conditions of that one carrier so as to enable the eNodeB to select and schedule use of an appropriate modulation and coding scheme for communication to and from the UE on that carrier. Whereas, if the context records indicate that the eNodeB is serving the UE in a carrier-aggregation mode, then the eNodeB may be set to schedule and manage air interface communications to and from the UE on the multiple serving carriers, at service level(s) in accordance with the bearer(s) at issue, and the UE may be set to monitor and report to the eNodeB the channel conditions of each of the carriers so as to enable the eNodeB to select and schedule use of an appropriate modulation and coding scheme for communication to and from the UE per carrier.

Note that the distinction between single-carrier mode and carrier-aggregation mode lies at least in part in how many carriers are encompassed by the UE's air interface connection, with each carrier perhaps being an industry standard carrier defined for LTE use, for example, and thus having a particular carrier bandwidth as discussed above for instance. For each carrier in the UE's air interface connection, whether just one or multiple, the eNodeB may be set to schedule and manage communications to and from the UE on the carrier, and the UE may be set to monitor and report to the eNodeB channel conditions of the carrier, and to receive and transmit packet data on the carrier in accordance with DCI messages or the like from the eNodeB.

As such, the distinction between single-carrier mode and carrier-aggregation mode need not be whether packet communication between the eNodeB and UE is in fact currently occurring on one carrier or rather on multiple carriers, as there may be times when no such packet flow occurs on a given such carrier even though the carrier is encompassed by the UE's air interface connection. Thus, in the single-carrier mode, there may be times when the eNodeB and UE do not have any packets to transmit. But the fact that the UE's air interface connection encompasses just a single carrier could mean that the UE is being served in a single-carrier mode, rather than a carrier-aggregation mode. Likewise, in a carrier-aggregation mode, there may be times when the eNodeB is scheduling and engaging in packet communication to or from the UE on just one of the multiple carriers in the UE's air interface connection. But the fact that the UE's air interface connection encompasses multiple carriers could mean that the UE is being served in a carrier-aggregation mode, rather than in a single-carrier mode.

As noted above, the present disclosure provides for dynamically configuring service of a UE to be either single-carrier mode or carrier-aggregation mode based at least in part on whether or not the UE is engaging in simultaneous voice and data communication. In particular, in response to at least detecting simultaneous voice and data communication by the UE, the eNodeB may invoke carrier aggregation service for the UE, configuring the UE's air interface connection to encompass multiple carriers rather than just one carrier. Whereas, in response to at least detecting absence (e.g., discontinuation) of simultaneous voice and data communication by the UE, and perhaps detecting continuation of just voice communication or just data communication by the UE, the eNodeB may invoke single-carrier service for the UE, configuring the UE's air interface connection to encompass just a single carrier rather than multiple carriers.

To facilitate this process, the eNodeB may monitor the state and/or content of the UE's communication to detect one or more factors supporting a reasonable conclusion as to whether the UE is engaged in voice communication (e.g., a voice call), and/or one or more factors supporting a reasonable conclusion as to whether the UE is engaged in data communication (e.g., any communication other than a voice call). By way of example, the eNodeB could engage in deep packet inspection, evaluating the content of packets transmitted to or from the UE, and/or the eNodeB could consider the type(s) of bearers (e.g., QCI level of one or more bearers) that the UE has and/or on which the UE is communicating.

Accordingly, the eNodeB can detect the presence or absence of voice call communication by a UE in various ways. For example, the eNodeB could read packets flowing on the UE's QCI 5 bearer and determine that the packets carry SIP signaling for setting up a VoIP call, as an indication of the imminent start of voice communication by the UE. Likewise, the eNodeB could read packets flowing on the UE's QCI 5 bearer and determine that the packets carry SIP signaling for ending a VoIP call, as an indication of the end of voice communication by the UE. Alternatively or additionally, the eNodeB could detect when a QCI 1 bearer is established for the UE, as an indication of the imminent start of voice communication by the UE. And likewise, the eNodeB could detect when a QCI 1 bearer of the UE's is torn down, as an indication of the end of voice communication by the UE. Still alternatively, the eNodeB could read the content of packets flowing to or from the UE and determine that the packets contain digitized voice in a form that would be used for a voice call for instance (e.g., using particular voice codecs), as an indication that the UE is engaging in voice communication. And likewise, the eNodeB could read the content of packets flowing to or from the UE and determine that no packets containing such digitized voice are flowing to or from the UE, as an indication of the end or absence of voice communication by the UE. And still further, the eNodeB could read the IP address of packets flowing to and/or from the UE and detect that that the IP addresses is that of a voice call communication entity, such as an IMS call server, as a basis to conclude that the UE is engaged in a voice call. Other examples are possible as well.

Similarly, the eNodeB can detect the presence or absence of data (e.g., non-voice-call) communication by a UE in various ways. For example, the eNodeB could detect flow of packets on any of the UE's bearers other than a QCI 1 bearer, and other than SIP VoIP call setup packets flowing on a QCI 5 bearer, as an indication that the UE is engaged in data communication. Or the eNodeB could read the content or addresses of packets flowing to and/or from the UE to detect data communication. Such data communication may be particularly non-continuous, as the UE may from time to time engage in various types of data communication, such as e-mail communication, file transfer, or the like. However, the eNodeB could be programmed to treat a specified sufficient rate of such data communication (e.g., at least a minimum specified number of bytes per second) as an indication of the UE engaging in data communication and less than that rate (or the absence of such communication for a particular threshold time period) as an indication of the data communication ending or of the UE not engaging in data communication.

In accordance with the present disclosure, the eNodeB may thus monitor whether the UE engages (e.g., is currently engaged or is about to engage) in simultaneous voice and data communication, as a basis to determine whether to serve the UE in a single-carrier mode or rather in a carrier-aggregation mode.

The eNodeB may detect the absence of simultaneous voice and data communication by the UE by detecting that the UE is engaged in neither voice nor data communication or by detecting that the UE is engaged in just voice communication or in just data communication. For example, the eNodeB may detect that the UE is engaged in just a voice call on a QCI 1 bearer, along with associated SIP signaling or other voice call control signaling on a QCI 5 bearer or the like, and that the UE is not engaging in data communication at the same time. Alternatively, the eNodeB may detect that the UE is engaged in just data communication (e.g., on bearers other than QCI 1 and QCI5) and that the UE is not engaging in a voice call at the same time. Still further, the eNodeB may detect the absence of simultaneous voice and data communication by detecting that the UE was engaged in simultaneous voice and data communication and that the voice or data communication has ended while the other has continued or has also ended.

In response to detecting the absence or imminent absence of simultaneous voice and data communication by the UE, and perhaps based on one or more additional considerations, the eNodeB may then responsively serve the UE in a single-carrier mode rather than a carrier-aggregation mode. For instance, the eNodeB may engage in RRC configuration signaling with the UE to configure the UE's RRC connection to encompass just one carrier, such as to modify the connection from encompassing multiple carriers to encompassing just one carrier.

Similarly, the eNodeB may detect the presence of simultaneous voice and data communication by the UE by detecting that the UE is engaged in or is about to engage in both voice communication and data communication concurrently. For example, the eNodeB may detect when the UE is engaged in data communication (not necessarily continuous, but sufficient to support a judgment that data communication is occurring) that the UE starts or is about to start engaging in a voice call, as an indication of simultaneous voice and data communication by the UE. And as another example, the eNodeB may detect when the UE is engaged in a voice call that the UE starts or is about to start engaging in data communication, as an indication of simultaneous voice and data communication by the UE.

In response to detecting the presence or imminent presence of simultaneous voice and data communication by the UE, and perhaps based on one or more additional considerations, the eNodeB may then responsively serve the UE in a carrier-aggregation mode rather than a single-carrier mode. For instance, the eNodeB may engage in RRC configuration signaling with the UE to configure the UE's RRC connection to encompass multiple carriers, such as to modify the connection from encompassing just one carrier to encompassing multiple carriers.

Figure 2:
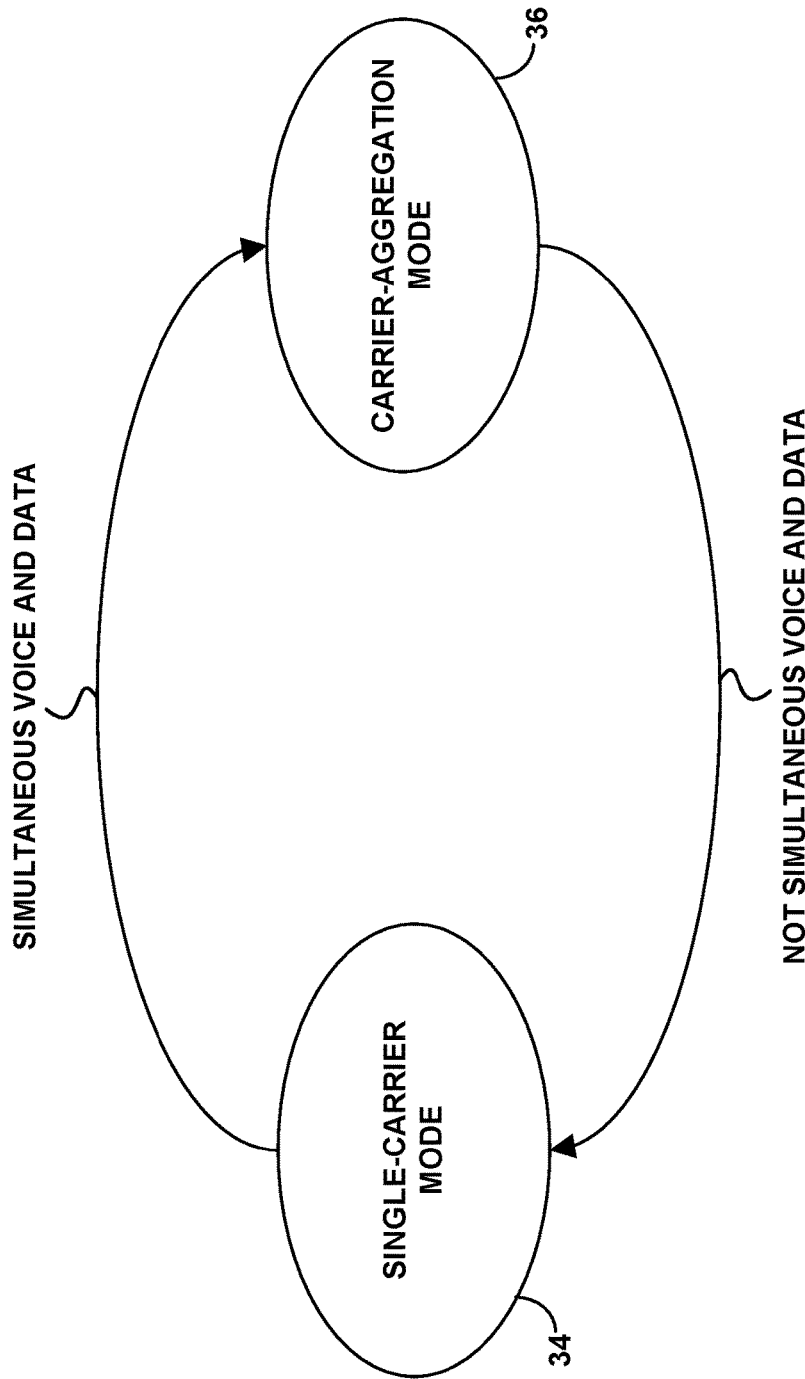
FIG. 2 is a state diagram depicting example operations in accordance with the disclosure.

FIG. 2 is a state diagram depicting this process in an example implementation. In particular, FIG. 2 depicts two modes of the eNodeB serving the UE as a single-carrier mode 34 and a carrier-aggregation mode 36. In line with the discussion above, in the single-carrier mode 34, the air interface connection between the eNodeB and the UE encompasses just one carrier, whereas in the carrier-aggregation mode 36, the air interface connection between the eNodeB and the UE encompasses multiple carriers. As shown in FIG. 2, when the eNodeB is serving the UE in the single-carrier mode, the eNodeB may detect simultaneous voice and data communication by the UE and responsively transition to instead serving the UE in the carrier-aggregation mode. Further, when the eNodeB is serving the UE in the carrier-aggregation mode, the eNodeB may detect the absence of simultaneous voice and data communication by the UE and responsively transition to instead serving the UE in the single-carrier mode.

Figure 3:
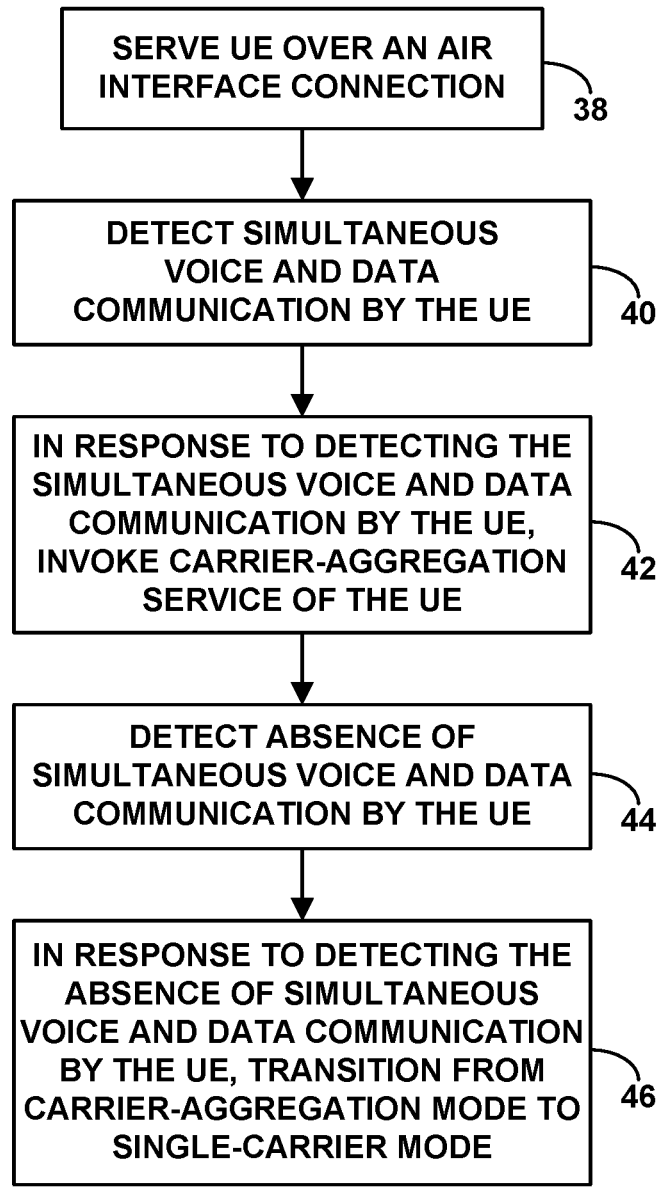
FIG. 3 is a flow chart depicting example operations in accordance with the disclosure.

FIG. 3 is next a flow chart depicting operations of an example method in line with the discussion above, to control service of a UE by a base station. As shown in FIG. 3, at block 38, the base station serves the UE over an air interface connection. Further, at block 40, the base station detects simultaneous voice and data communication by the UE. And at block 42, in response to detecting the simultaneous voice and data communication by the UE, the base station invokes carrier-aggregation service of the UE. For instance, if the base station was serving the UE in a single-carrier mode, the base station could transition to serving the UE instead in a carrier-aggregation mode, by modifying the air interface connection to encompass multiple carriers instead of just one carrier (e.g., engaging in RRC signaling with the UE to inform the UE that the air interface connection encompasses the multiple carriers and to identify each encompassed carrier, and updating one or more applicable context records).

Further in line with the discussion above, the simultaneous voice and data communication at issue could be simultaneous voice-call communication and non-voice-call communication, such as simultaneous VoIP call communication and non-VoIP call communication, even if not continuous. And the base station could detect the simultaneous voice-call communication and non-voice-call communication based on consideration of factors such as deep packet inspection of one or more packets flowing to or from the UE and/or service level (e.g., QCI) of one or more bearers over which packets flow to or from the UE.

As additionally illustrated in FIG. 3, at block 44, once the base station has invoked carrier-aggregation service for the UE and is thus serving the UE in a carrier-aggregation mode, the base station may then detect an absence (e.g., discontinuation) of simultaneous voice and data communication by the UE. And at block 46, in response to detecting the absence of simultaneous voice and data communication by the UE, the base station may then transition from serving the UE in the carrier-aggregation mode to serving the UE in a single-carrier mode.

Figure 4:
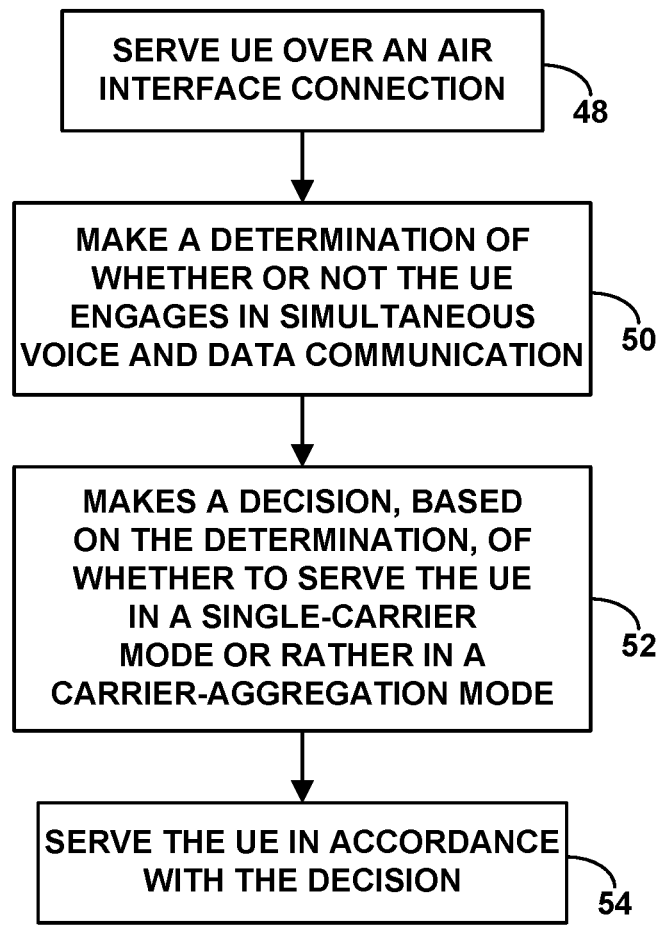
FIG. 4 is another flow chart depicting example operations in accordance with the disclosure.

FIG. 4 is next another flow chart depicting operations of an example method in line with the discussion above, to control service of a UE by a base station. As shown in FIG. 4, at block 48, the base station serves the UE over an air interface connection between the base station and the UE. Further at block 50, the base station then makes a determination of whether or not the UE engages in simultaneous voice and data communication. At block 52, the base station then makes a decision, based on the determination, of whether to serve the UE in a single-carrier mode or rather in a carrier-aggregation mode. And at block 54, the base station then serves the UE in accordance with the decision (either serving the UE in the single-carrier mode or serving the UE in the carrier-aggregation mode).

Various features and operations described above and below can be applied in the context of this method, and vice versa. For example, the act of making the decision of whether to serve the UE in the single-carrier mode or rather in the carrier-aggregation mode could involve (i) if the determination is that the UE does not engage in simultaneous voice and data communication, then deciding to serve the UE in the single-carrier mode and (ii) if the determination is that the UE engages in simultaneous voice and data communication, then deciding to serve the UE in the carrier-aggregation mode. Further, as discussed above, the voice communication could be voice-call communication and the data communication could be non-voice-call communication, and so the determination of whether the UE engages in simultaneous voice and data communication could be a determination of whether the UE engages in simultaneous voice-call and non-voice-call communication.

Figure 5:
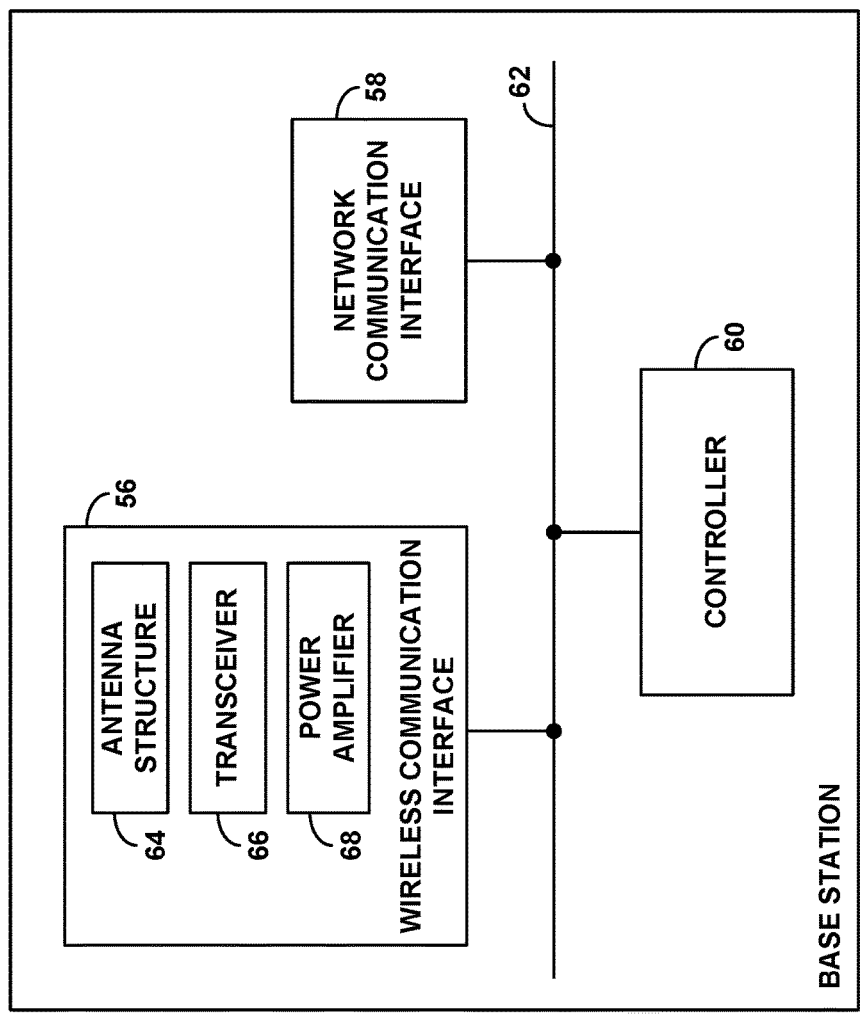
FIG. 5 is a simplified block diagram of an example base station operable in accordance with the disclosure.

Finally, FIG. 5 is a simplified block diagram of a base station of an example base station, showing some of the components that such a device may include in order to carry out operations such as those discussed above. The "base station" here can take various forms, including for instance, a macro base station, a small cell (e.g., femtocell) base station, a relay base station, and/or perhaps one or more associated radio-access-network entities, such as any entity that could carry out operations such as determining whether a served UE engages in simultaneous voice and data communication and, based on that determination, controlling whether the UE is served in a single-carrier mode or in a carrier-aggregation mode.

As shown, the example base station includes a wireless communication interface 56, a network communication interface 58, and a controller 60, all of which could be integrated together in various ways or, as shown, interconnected with each other through a system bus, network, or other connection mechanism 62.

Wireless communication interface 56 includes an antenna structure (e.g., one or more antennas or antenna elements) 64, which could be tower mounted or provided in some other manner, configured to transmit and receive over the air interface and thereby facilitate communication with served UEs. Further, the wireless communication interface includes a transceiver 66 and power amplifier 68 supporting air interface communication according to an applicable air interface protocol. Network communication interface 58 may then comprise one or more wired and/or wireless network interfaces (such as an Ethernet interface) through which the base station may communicate with various other core network entities such as an SGW, MME, and the like.

Controller 60, which may be integrated with wireless communication interface 56, with network communication interface 58, and/or with one or more other components of the base station, may then be configured to manage service of a UE as discussed above. By way of example, controller 60 may be configured to (i) make a determination of whether a UE served by the base station over the air interface engages in simultaneous voice and data communication (e.g., simultaneous voice-call communication and non-voice-call communication), (ii) make a decision, based on the determination of whether the UE engages in simultaneous voice and data communication, of whether the base station should serve the UE in a single-carrier mode or rather in a carrier-aggregation mode, and (iii) cause the base station to serve the UE in accordance with the decision.

Controller 60 could be implemented using hardware, software, and/or firmware. For example, controller 60 could include one or more processors and a non-transitory computer readable medium (e.g., volatile and/or non-volatile memory) that stores machine language instructions or other executable instructions. The instructions, when executed by the one or more processors, may cause controller 60, and thus the base station, to carry out the various base station operations described herein.

Exemplary embodiments have been described above. Those skilled in the art will understand, however, that changes and modifications may be made to these embodiments without departing from the true scope and spirit of the invention.

We claim:

1. A method of controlling service of a user equipment device (UE) by a base station, the method comprising:
    serving by the base station the UE over an air interface connection;
    detecting by the base station simultaneous voice and data communication by the UE; and
    responsive to the detecting the simultaneous voice and data communication by the UE, invoking by the base station carrier-aggregation service of the UE,
    wherein, in the single-carrier mode, the air interface connection encompasses just one carrier, and in the carrier-aggregation mode, the air interface connection encompasses multiple carriers,
    wherein invoking by the base station carrier-aggregation service of the UE comprises transitioning by the base station from serving the UE in a single-carrier mode to serving the UE in a carrier-aggregation mode, and
    wherein transitioning from serving the UE in the single-carrier mode to serving the UE in the carrier-aggregation mode comprises modifying the air interface connection to encompass the multiple carriers instead of just the one carrier.

2. The method of claim 1, wherein each carrier has a defined frequency bandwidth and defines channels comprising a physical downlink control channel (PDCCH), a physical downlink shared channel (PDSCH), and a physical uplink shared channel (PUSCH).

3. The method of claim 1, wherein modifying the air interface connection comprises engaging in Radio Resource Control (RRC) signaling with the UE to inform the UE that the air interface connection encompasses the multiple carriers and to identify each encompassed carrier.

4. The method of claim 1, wherein the simultaneous voice and data communication is simultaneous voice-call communication and non-voice-call communication.

5. The method of claim 4, wherein the voice-call communication comprises voice over Internet Protocol (VoIP) call communication.

6. The method of claim 4, wherein detecting the simultaneous voice-call communication and non-voice-call communication is based on at least one factor selected from the group consisting of (i) deep packet inspection of one or more packets flowing to or from the UE and (ii) service level of a bearer over which packets flow to or from the UE.

7. The method of claim 1, wherein invoking by the base station carrier-aggregation service of the UE comprises beginning by the base station to serve the UE in a carrier-aggregation mode, the method further comprising:
    after invoking the carrier-aggregation service of the UE, detecting by the base station an absence of simultaneous voice and data communication by the UE; and
    responsive to detecting the absence of simultaneous voice can data communication by the UE, transitioning by the base station from serving the UE in the carrier-aggregation mode to serving the UE in a single-carrier mode.

8. The method of claim 7,
    wherein transitioning from serving the UE in the carrier-aggregation mode to serving the UE in the single-carrier mode comprises modifying the air interface connection to encompass just the one carrier rather than the multiple carriers.

9. The method of claim 8, wherein each carrier has a defined frequency bandwidth and defines channels comprising a physical downlink control channel (PDCCH), a physical downlink shared channel (PDSCH), and a physical uplink shared channel (PUSCH).

10. The method of claim 8, wherein modifying the air interface connection to encompass just the one carrier rather than the multiple carriers comprises engaging in Radio Resource Control (RRC) signaling with the UE to inform the UE that the air interface connection encompasses just the one carrier and to identify the one encompassed carrier.

11. A method of controlling service of a user equipment device (UE) by a base station, the method comprising:
    serving, by a base station, the UE over an air interface connection between the base station and the UE;
    making a determination by the base station of whether or not the UE engages in simultaneous voice and data communication;
    based on the determination of whether or not the UE engages in simultaneous voice and data communication, making a decision by the base station of whether to serve the UE in a single-carrier mode or rather in a carrier-aggregation mode; and
    serving by the base station the UE in accordance with the decision,
    wherein, if the determination is that the UE engages in simultaneous voice and data communication, then, in response to the determination, the base station responsively configures the air interface connection to encompass multiple carriers rather than just one carrier and the base station serves the UE in the carrier-aggregation mode on the multiple carriers.

12. The method of claim 11, wherein making the decision of whether to serve the UE in the single-carrier mode or rather in the carrier-aggregation mode comprises:
    if the determination is that the UE does not engage in simultaneous voice and data communication, then deciding to serve the UE in the single-carrier mode; and
    if the determination is that the UE engages in simultaneous voice and data communication, then deciding to serve the UE in the carrier-aggregation mode.

13. The method of claim 12, wherein voice communication is voice-call communication and data communication is non-voice-call communication, and wherein the determination of whether the UE engages in simultaneous voice and data communication is a determination of whether the UE engages in simultaneous voice-call and non-voice-call communication.

14. The method of claim 11, wherein each carrier has a defined frequency bandwidth and defines channels comprising a physical downlink control channel (PDCCH), a physical downlink shared channel (PDSCH), and a physical uplink shared channel (PUSCH).

15. The method of claim 11, wherein the determination of whether or not the UE engages in simultaneous voice and data communication is based on at least one factor selected from the group consisting of (i) deep packet inspection of one or more packets flowing to or from the UE and (ii) service level of a bearer over which packets flow to or from the UE.

16. A base station comprising:
    an antenna structure for communicating over a radio-frequency air interface; and
    a controller configured to manage communication via the antenna structure over the air interface,
    wherein the controller is configured to (i) make a determination of whether a UE served by the base station over the air interface engages in simultaneous voice and data communication, (ii) make a decision, based on the determination of whether the UE engages in simultaneous voice and data communication, of whether the base station should serve the UE in a single-carrier mode or rather in a carrier-aggregation mode, and (iii) cause the base station to serve the UE in accordance with the decision
    wherein, if the determination is that the UE engages in simultaneous voice and data communication, then, in response to the determination, the base station responsively configures the air interface connection to encompass multiple carriers rather than just one carrier and the base station serves the UE in the carrier-aggregation mode on the multiple carriers.

17. The base station of claim 16, wherein the simultaneous voice and data communication is simultaneous voice-call communication and non-voice-call communication.

* * * * *